United States Patent
DeGrace

(10) Patent No.: US 6,199,843 B1
(45) Date of Patent: Mar. 13, 2001

(54) ANTI-FRICTION HELICAL SPRING ASSEMBLY TO PREVENT ONE END OF A SPRING FROM ROTATING DURING EXPANSION OR COMPRESSION OF THE SPRING

(75) Inventor: Louis G. DeGrace, Newport News, VA (US)

(73) Assignee: Siemens Automotive Corporation, Auburn Hills, MI (US)

(*) Notice: Subject to any disclaimer, the term of this patent is extended or adjusted under 35 U.S.C. 154(b) by 0 days.

(21) Appl. No.: 09/290,313

(22) Filed: Apr. 12, 1999

(51) Int. Cl.[7] ........................................... F16F 1/06
(52) U.S. Cl. ..................... 267/179; 123/90.11; 123/90.65
(58) Field of Search ........................ 267/179; 123/90.11, 123/90.65, 90.67, 188.13, 188.17, 90.28, 90.52; 251/129.18, 129.01, 321, 322, 323

(56) References Cited

U.S. PATENT DOCUMENTS

| | | | |
|---|---|---|---|
| 1,363,398 | * 12/1920 | Davies | 123/90.52 |
| 1,442,698 | * 1/1923 | Page | 123/90.34 |
| 1,470,102 | 10/1923 | Rahm . | |
| 1,504,774 | * 8/1924 | Martin | 123/90.39 |
| 1,513,075 | 10/1924 | Trembley . | |
| 1,528,193 | 3/1925 | Buck . | |
| 1,596,484 | 8/1926 | Garlick . | |
| 1,905,888 | 4/1933 | Berry . | |
| 2,051,313 | * 8/1936 | Olenick | 123/90.34 |
| 2,589,418 | 3/1952 | Mitzelfeld | 123/90 |
| 2,660,990 | 12/1953 | Zmuda et al. | 123/90 |
| 2,664,076 | 12/1953 | Dadd et al. | 123/90 |
| 2,743,714 | 5/1956 | Hanson, Jr. et al. | 123/90 |
| 2,827,886 | 3/1958 | Geer | 123/90 |
| 2,841,128 | 7/1958 | Aiken | 123/90 |
| 3,025,841 | * 3/1962 | Beckham | 123/90 |
| 3,195,528 | * 7/1965 | Franklin | 123/90 |
| 4,007,716 | 2/1977 | Jones | 123/90.28 |
| 4,597,408 | 7/1986 | Canter | 137/331 |
| 4,827,882 | * 5/1989 | Paul et al. | 123/292 |
| 5,148,779 | 9/1992 | Okuse et al. | 123/90.28 |
| 5,322,039 | * 6/1994 | Kinsey | 123/90.67 |
| 5,832,883 | * 11/1998 | Bae | 123/90.11 |
| 6,029,789 | * 2/2000 | Lindner | 192/85 |
| 6,047,673 | * 4/2000 | Lohse et al. | 123/90.11 |
| 6,078,235 | * 6/2000 | Schebitz et al. | 335/220 |
| 6,082,315 | * 7/2000 | Schneider | 123/90.11 |

* cited by examiner

Primary Examiner—Robert J. Oberleitner

(57) ABSTRACT

A spring assembly 12 for an electromagnetic actuator 10 is provided. The actuator 10 has an armature 18 mounted for movement between two electromagnets 14 and 16 and a shaft 22 operatively associated with the armature. The spring assembly 12 includes a housing 34 having a surface feature 52 therein and is coupled to the actuator. A helical spring 32 is disposed in the housing 34 so as to be compressed and allowed to expand. The spring 32 has first and second ends with the second end biasing the shaft 22. A spring retainer 38 engages the first end of the spring 32. The spring retainer 38 has a surface feature 48 therein. A ball bearing 40 is received by the surface feature 52 of the housing 34 and the surface feature 48 of the spring retainer 38. When the spring 32 is compressed and then expanded, torque produced by the spring 32 is transferred to the ball bearing 40 which rotates with respect to the housing 34, permitting the first end of the spring to rotate while substantially preventing torque from being transferred from the spring 32 to the shaft 22 and armature 18.

20 Claims, 2 Drawing Sheets

ANTI-FRICTION HELICAL SPRING ASSEMBLY TO PREVENT ONE END OF A SPRING FROM ROTATING DURING EXPANSION OR COMPRESSION OF THE SPRING

FIELD OF THE INVENTION

This invention relates to a helical spring assembly having a helical spring which engages a member at each end of the spring and, more particularly, to a helical spring assembly which directs the transmission of torque, produced by spring windup, to only one of the members.

BACKGROUND OF THE INVENTION

In any device containing a helical spring which is flexed to store energy, the helical spring will "wind-up" as the spring is compressed, and unwind as the spring is allowed to expand. This winding of the spring imparts torque to the parts constraining the ends of the spring, and to any members attached to the spring constraining parts. An example of a device exhibiting this wind-up condition is an upper spring assembly of an electromagnetic actuator.

A conventional electromagnetic actuator for opening and closing a valve of an internal combustion engine generally includes "open" and "close" electromagnets which, when energized, produce an electromagnetic force on an armature. The armature is biased by a pair of identical upper and lower springs arranged in parallel. The armature is coupled with a gas exchange valve of the engine. The armature rests approximately half-way between the open and close electromagnets when the springs are in equilibrium. When the armature is held by a magnetic force in either the closed or opened position (at rest against the open or close electromagnet), potential energy is stored by the springs. If the magnetic force is shut off with the armature in the opened position, the spring's potential energy will be converted to kinetic energy of the moving mass and cause the armature to move towards the close electromagnet. If friction is sufficiently low, the armature can then be caught in the closed position by applying current to the close electromagnet.

Generally, the upper helical spring of the actuator is in a compressed state and is allowed to expand during operation of the actuator. The upper helical spring is generally constrained at one end by a spring adjusting screw and by a shaft assembly at the other end of the spring. The shaft assembly is coupled to the armature of the actuator. Thus, the upper helical spring can undesirably cause torque to be transmitted to the armature, which should not rotate. One method of preventing rotation of the armature is to provide some guiding mechanism for the armature. However, in a device such as an actuator which operates millions of strokes in its lifetime, a guiding mechanism can wear out quickly.

Accordingly, a need exists to provide a low cost spring assembly which allows one end of the spring to rotate during expansion thereof, yet substantially prevents torque from being transmitted to a member engaged with the other end of the spring.

SUMMARY OF THE INVENTION

An object of the present invention is to fulfill the need referred to above. In accordance with the principles of the present invention, this objective is obtained by providing a spring assembly for an electromagnetic actuator. The actuator has an armature mounted for movement between two electromagnets and a shaft operatively associated with the armature. The spring assembly includes a housing having a surface feature therein and coupled to the actuator. A helical spring is disposed in the housing so as to be compressed and allowed to expand. The spring has first and second ends with the second end biasing the shaft. A spring retainer engages the first end of the spring. The spring retainer has a surface feature therein. A ball bearing is received by the surface feature of the housing and the surface feature of the spring retainer. When the spring is compressed and then expanded, torque produced by the spring is transferred to the ball bearing which rotates with respect to the housing, permitting the first end of the spring to rotate freely while substantially preventing torque from being transferred from the spring to the shaft and armature.

In accordance with another aspect of the invention, a helical spring assembly includes a housing having a surface feature therein. A helical spring is disposed in the housing so as to be compressed and allowed to expand. The spring has first and second ends. The spring retainer engages the first end of the spring. The spring retainer has a surface feature therein. A ball bearing is received by the surface feature of the housing and the surface feature of the spring retainer. A spring biased member is operatively associated with the second end of the spring so as to be biased by the spring. When the spring is compressed and then expanded, torque produced by the spring is transferred to the ball bearing which rotates with respect to the housing, permitting the first end of the spring to rotate freely while substantially preventing torque from being transferred from the spring to the spring biased member.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
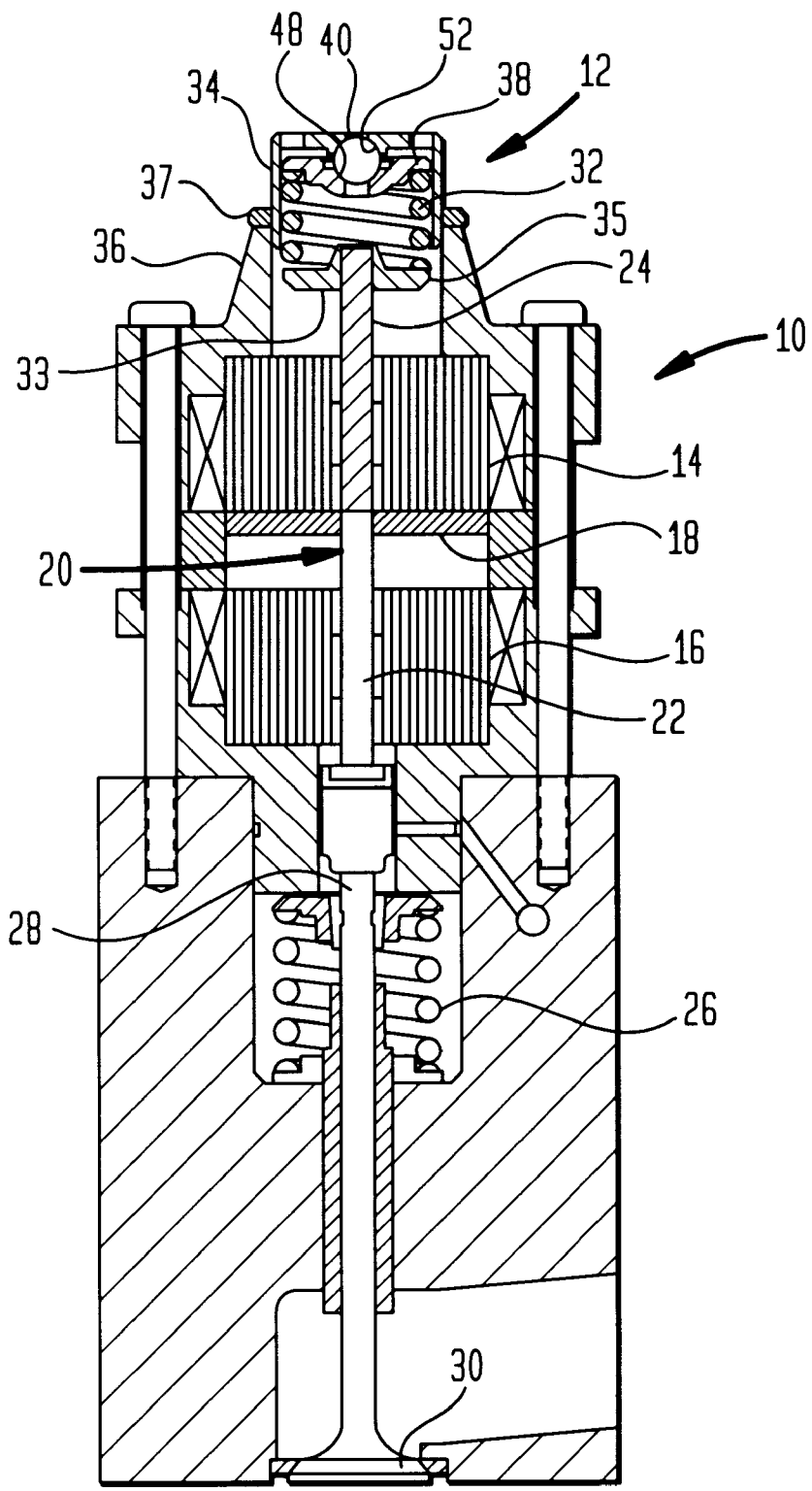
FIG. 1 is cross-sectional view of an electromagnetic actuator and gas exchange valve assembly employing a helical spring assembly provided in accordance with the principles of the present invention.

Referring to FIG. 1, a cross-sectional view of an electromagnetic actuator is shown, generally indicated 10, including a helical spring assembly, generally indicated at 12, provided in accordance with the principles of the present invention. Although the spring assembly 12 will be described for use in an electromagnetic actuator, it can be appreciated that the spring assembly 12 may be employed in any device which includes a helical spring which is constrained by a member at each opposing end of the spring, wherein it is desirable that one of the members be substantially prevented from rotating due to torque generated during unwinding of the helical spring.

The electromagnetic actuator 10 includes an upper electromagnet 14 and a lower electromagnet 16. An armature 18 is arranged for movement between the electromagnets 14 and 16. The armature 18 is associated with shaft structure, generally indicated at 20. In the illustrated embodiment, the shaft structure 20 comprises a lower shaft 22 coupled to the armature 18 and an upper shaft 24 aligned axially with the lower shaft 22 and constructed and arranged to be biased by the upper spring assembly 12 to engage the armature 18. It can be appreciated that upper and lower shafts may be a unitary shaft member operatively associated with the armature 18.

A pair of opposing spring assemblies are associated with the armature 18. One spring assembly includes a helical spring 26 associated with the stem 28 of a gas exchange valve 30. The upper spring assembly 12 defines the other spring assembly of the pair and includes a helical spring 32. The upper shaft 24 includes a spring seat 33 engaged with end 35 of the spring 32.

In accordance with the principles of the present invention, the upper spring assembly includes a housing 34 containing the helical spring 32 so that spring 32 may be compressed and allowed to expand. In the illustrated embodiment, the housing 34 is a spring adjusting screw which is threaded into a threaded bore in an actuator housing 36 so as to adjust the compression of the helical spring 32. Once the spring 32 is adjusted, the adjusting screw 34 is locked with respect to the actuator housing 36 via a lock nut 37 threaded onto external threads of the adjusting screw 34 or other means and engaged with a surface of the actuator housing 36.

Figure 2:
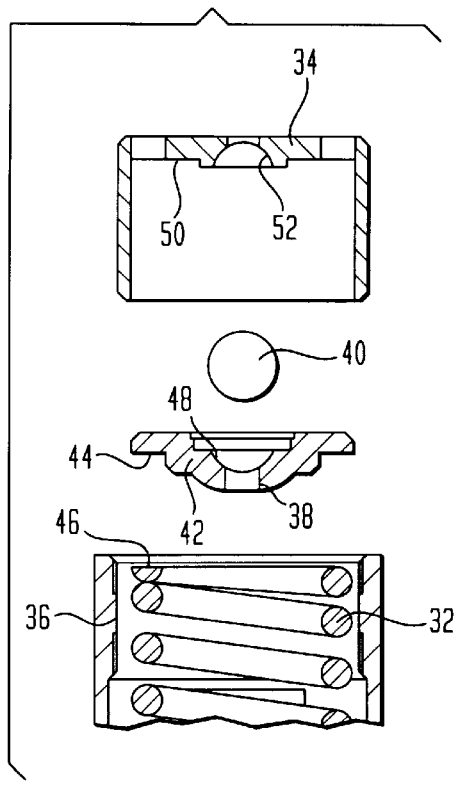
FIG. 2 is an enlarged, exploded view of the helical spring assembly of the actuator of FIG. 1.
Figure 3:
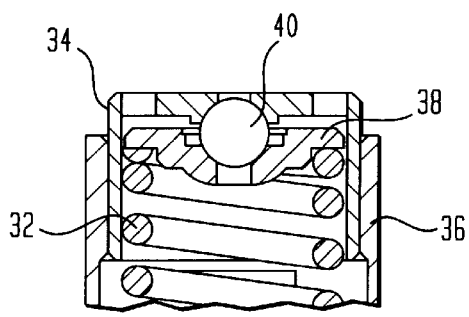
FIG. 3 is an enlarged cross-sectional view of the spring assembly of FIG. 1 and FIG. 2.

As best shown in FIGS. 2 and 3, the spring assembly 12 comprises a spring retainer structure including a spring retainer 38 and a torque transferring element in the form of a ball bearing 40. The spring retainer is preferably stamped from metal so as to be manufactured inexpensively and the ball bearing 40 is a conventional item, preferably a steel ball bearing or other suitable hard material with good compression strength, wear and low friction characteristics. The spring retainer 38 includes a portion 42 having a diameter sized to be received in the interior of the helical spring 32. The spring retainer 38 also has an annular flange 44 which rests on the end 46 of the helical spring 32. A surface feature in the form of a generally half-spherical recess 48 is defined in the spring retainer 38 for receiving a portion of the ball bearing 40. The half-spherical recess 48 has a radius larger than the radius of the ball bearing 40. The spring retainer 38 is disposed between the end 46 of the spring and the surface 50 of the adjusting screw 34.

As best shown in FIGS. 2 and 3, the adjusting screw 34 includes a surface feature therein generally in the form of a half-spherical recess 52 of generally the same size as the recess 48 in the spring retainer 38 such that the ball bearing 40 may engage each half-spherical recess 48 and 52 (FIG. 3) and rotate freely therein. The ball bearing 40 is located on the longitudinal axis 31 (FIG. 2) of the spring 32. The ball bearing 40, not the spring 32, contacts the adjusting screw 34 which mitigates any tendency of an imperfectly ground spring to buckle or perform in a non-uniform manner as it oscillates.

The spring assembly 12 functions as follows. Once the compression of the spring 32 is set by the adjusting screw 34, the actuator 10 is ready for operation. The electromagnets 14 and 16 and the kinetic energy stored by the springs 26 and 32 cause the armature 18 to oscillate. Unwinding of the upper spring 32 upon expansion thereof causes end 46 of spring 32 to rotate which causes torque to be transmitted to the ball bearing 40 causing the ball bearing 40 to rotate freely with respect to the adjusting screw 34. This substantially prevents end 35 (FIG. 1) of the spring 32 from rotating and, advantageously torque from the spring 32 is substantially prevented from being transferred to the shaft 24 and the armature 18.

Figure 4:
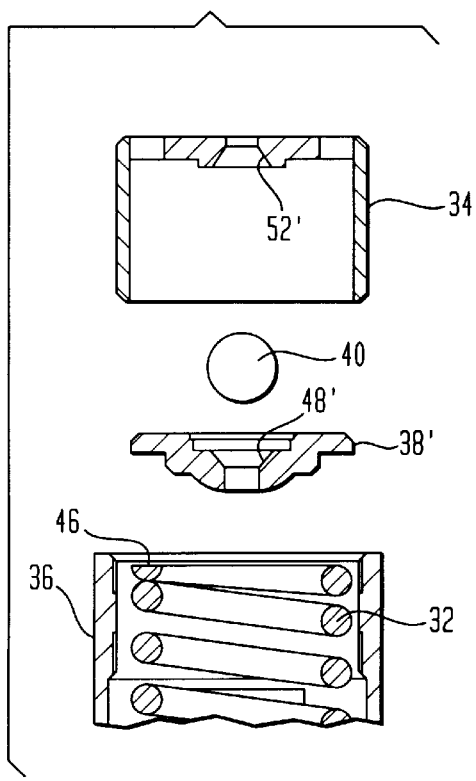
FIG. 4 is an enlarged, exploded view of a helical spring assembly provided in accordance with a second embodiment of the invention.
Figure 5:
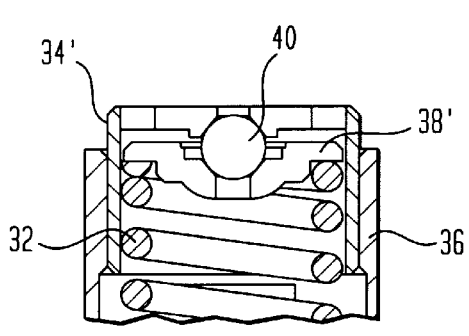
FIG. 5 is an enlarged cross-sectional view of the spring assembly of FIG. 4.

With reference to FIGS. 4 and 5, a second embodiment of the upper spring assembly of the invention is shown. This embodiment is identical to the embodiment of FIGS. 1–3, but for the surface features in the spring retainer 38' and the adjusting screw 34'. The surface feature 52' in the adjusting screw 34' and the surface feature 48' in the spring retainer 38' are each conically shaped to receive the ball bearing 40.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A helical spring assembly comprising:
   a housing having a surface feature and defining an interior space,
   a helical spring having a longitudinal axis and being disposed in at least a portion of said interior space of said housing so as to be compressed and allowed to expand, said spring having first and second ends,
   spring retainer engaging said first end of said spring, said spring retainer having a surface feature therein,
   a ball bearing received by said surface feature of said housing and said surface feature of said spring retainer so as to be disposed on said longitudinal axis, and
   a spring biased member operatively associated with said second end of said spring so as to be biased by said spring,
   wherein, when said spring is compressed and then expanded, torque produced by said spring is transferred to said ball bearing which rotates with respect to said housing, permitting said first end of said spring to rotate freely while substantially preventing torque from being transferred from said spring to said spring biased member.

2. The spring assembly according to claim 1, wherein said spring retainer has a spring seat engaged with said first end of said spring.

3. The spring assembly according to claim 2, wherein said spring retainer has a portion which extends into an interior of said spring.

4. The spring assembly according to claim 1, wherein said surface feature of said spring retainer and said feature in said surface of said housing each define a half spherical recess such that said bearing is free to rotate within said recesses.

5. The spring assembly according to claim 1, wherein said surface feature of said spring retainer and said feature in said surface of said housing each define a conical recess such that said bearing is free to rotate within said recesses.

6. The spring assembly according to claim 1, wherein said spring retainer is a metal stamping.

7. The spring assembly according to claim 1, wherein said ball bearing is made of steel.

8. The spring assembly according to claim 1, wherein said spring retainer and said ball bearing are constructed and arranged to prevent contact of said first end of said spring with a surface of said housing.

9. A spring assembly for an electromagnetic actuator, the actuator having an armature mounted for movement between two electromagnets and a shaft operatively associated with said armature, said spring assembly comprising:

a housing having a surface feature and coupled to the actuator the housing defining an interior space, a helical spring having a longitudinal axis and being disposed in at least a portion of the interior space of said housing so as to be compressed and allowed to expand, said spring having first and second ends with said second end biasing the shaft, a spring retainer engaging said first end of said spring, said spring retainer having a surface feature therein, and a ball bearing received by said surface feature of said housing and said surface feature of said spring retainer so as to be disposed on said longitudinal axis, wherein, when said spring is compressed and then expanded, torque produced by said spring is transferred to said ball bearing which rotates with respect to said housing, permitting said first end of said spring to rotate freely while substantially preventing torque from being transferred from said spring to the shaft and armature.

10. The spring assembly according to claim 9, wherein said spring retainer has a spring seat engaged with said first end of said spring.

11. The spring assembly according to claim 10, wherein said spring retainer has a portion which extends into an interior of said spring.

12. The spring assembly according to claim 9, wherein said surface feature of said spring retainer and said feature in said surface of said housing each define a half spherical recess such that said bearing is free to rotate within said recesses.

13. The spring assembly according to claim 9, wherein said surface feature of said spring retainer and said feature in said surface of said housing each define a conical recess such that said bearing is free to rotate within said recesses.

14. The spring assembly according to claim 9, wherein said spring retainer and said ball bearing are constructed and arranged to prevent contact of said first end of said spring with a surface of said housing.

15. An electromagnetic actuator comprising:

a housing, an upper electromagnet in said housing, a lower electromagnet in said housing and spaced from said upper electromagnet, an armature mounted for movement between said upper and lower electromagnets, shaft structure operatively associated with said armature for movement therewith, and a helical spring assembly biasing said shaft structure, said spring assembly comprising:

an adjusting screw threadedly coupled with said housing and having a surface feature therein, a helical spring having a longitudinal axis and being disposed in said adjusting screw so as to be compressed and allowed to expand, said spring having first and second ends, said second end engaging said shaft structure, a spring retainer engaging said first end of said spring, said spring retainer having a surface feature therein, and a ball bearing received by said surface feature of said adjusting screw and said surface feature of said spring retainer so as to be disposed on said longitudinal axis, wherein, when said spring is compressed and then expanded, torque produced by said spring is transferred to said ball bearing which rotates with respect to said adjusting screw, permitting said first end of said spring to rotate freely while substantially preventing torque from being transferred from said spring to said shaft structure and armature.

16. The actuator according to claim 15, wherein said spring retainer has a spring seat engaged with said first end of said spring.

17. The actuator according to claim 16, wherein said spring retainer has a portion which extends into an interior of said spring.

18. The actuator according to claim 15, wherein said surface feature of said spring retainer and said feature in said surface of said adjusting screw each define a half spherical recess such that said bearing is free to rotate within said recesses.

19. The actuator according to claim 15, wherein said surface feature of said spring retainer and said feature in said surface of said adjusting screw each define a conical recess such that said bearing is free to rotate within said recesses.

20. The actuator according to claim 15, wherein said spring retainer and said ball bearing are constructed and arranged to prevent contact of said first end of said spring with a surface of said housing.

\* \* \* \* \*